United States Patent [19]

Davies

[11] Patent Number: 5,599,634
[45] Date of Patent: Feb. 4, 1997

[54] THIN CEMENMTITIOUS SURFACE COATINGS

[75] Inventor: Derek Davies, Ashbourne, United Kingdom

[73] Assignee: British Technology Group Inter-Corporate Licensing Limited, London, England

[21] Appl. No.: 481,368

[22] PCT Filed: Jan. 12, 1994

[86] PCT No.: PCT/GB94/00054

§ 371 Date: Jul. 7, 1995

§ 102(e) Date: Jul. 7, 1995

[87] PCT Pub. No.: WO94/15889

PCT Pub. Date: Jul. 21, 1994

[30] Foreign Application Priority Data

Jan. 14, 1993 [GB] United Kingdom .................. 9300654

[51] Int. Cl.⁶ ........................................ B32B 9/00
[52] U.S. Cl. ...................... 427/688; 427/369; 427/397.7
[58] Field of Search ..................... 427/294, 369, 427/397.7; 428/688

[56] References Cited

U.S. PATENT DOCUMENTS 4,060,953  12/1977  Milne .................................. 427/294 X
4,284,433   8/1981  Aignesberger et al. .............. 106/725
4,503,096   3/1985  Specht ................................... 427/359
5,171,724  12/1992  Iwadoh et al. ..................... 501/127 X

FOREIGN PATENT DOCUMENTS 2442183    3/1976  Germany .
1512457    6/1978  United Kingdom .
WO91/12218 8/1991  WIPO .

OTHER PUBLICATIONS

Patent Abstracts of Japan, vol. 14 No. 155 (M–954) (4098) 26 Mar. 1990 & JP A 02 016 003, abstract.

Database WPI, Week 9145, Derwent Publications Ltd., London, GB; AN 91–329131 & P a 3 219 917 Sep. 1991, abstract.

*Primary Examiner*—Michael Lusignan
*Attorney, Agent, or Firm*—Nixon & Vanderhye

[57]  ABSTRACT

A thin durable decorative coating is applied to a concrete substrate such as a floor by applying a 0.1 mm coating of runny cement-plus-fines (water:cement=1:1) to the substrate. Capillary suction by the substrate very rapidly dewaters the coating, which is compacted by atmospheric pressure and matures to form an inseparable coating on the substrate. The fines may include colourings, mica or other additives to enhance the final appearance.

15 Claims, No Drawings

THIN CEMENMTITIOUS SURFACE COATINGS

FIELD OF THE INVENTION

This invention relates to thin cementitious surface coatings, which may be smooth, textured, patterned, coloured or otherwise decorative, and a method of producing them. It is desirable for such coatings to be hard, dense, impermeable, durable and abrasion-resistant.

BACKGROUND TO THE INVENTION

Concrete and cementitious materials generally are a compromise between the conflicting needs to achieve workability for ease of placing and good compaction, usually attained by adding more water, and to achieve strength by reducing the water content and water:cement ratio and increasing the content of dimensionally stable fillers (aggregate). It is particularly important to have a free flowing material when this has to be spread onto a surface, particularly with thin surface layers. Shrinkage is a fundamental problem with cementitious materials especially on site and is frequently the cause of premature failure and unsatisfactory performance due to self-induced cracking and fracture. Shrinkage occurs mainly in relation to the cement particles, due both to drying and chemical, autogenous shrinkage. To reduce shrinkage requires the inclusion of sufficient quantities of dimensionally stable fillers to reduce the quantity of the cement paste. With conventional concrete it is possible to reduce the shrinkage caused by the liquid cementitious phase by incorporating sufficient larger particles of dimensionally stable aggregate, and because the surface area of this larger Filler is limited the water demand to achieve workability and the water:cement ratio may not be too adversely affected. This certainly cannot be done with thin cementitious coatings (too thin to accommodate such larger particles).

It is generally accepted that cementitious materials must be cured and that the premature loss of water (even by evaporation) should be prevented, and, for this reason, they should not be applied to surfaces having a high suction as this removes the water required for hydration and exacerbates shrinkage cracking. Thus, according to the basic technical reference manual 'Properties of Concrete', edited by Professor Neville, "Loss of water by evaporation From the surface of the concrete or by suction from dry concrete below aggravates the plastic shrinkage and can lead to surface cracking . . . Placing concrete on a dry subgrade should be avoided . . . The object of curing is to keep the concrete saturated, or as near saturated as possible, until the originally water filled space in the fresh cement paste has been filled to the desired extent by the products of hydration of the cement . . . The loss of strength due to inadequate curing is more pronounced in thinner elements."

To overcome the problems of shrinkage cracking with thinner cementitious materials which require reasonable strength, such as flooring screeds, it is common to use semi dry mortar mixes. In these the water content is kept down to a minimum and the material is not saturated with water (i.e. there is no liquid cementitious phase), as in the conventional use of on-site concrete. With the use of such semi dry materials the placing and compaction are difficult and it is not possible to achieve a smooth dense surface finish which is often desirable.

The problems of high shrinkage of thin cementitious materials are discussed in International PCT Publication No WO91/12218, and the means of overcoming these is by placing the materials dry so that the solid particles thereof are touching, and then adding the water for hydration, whereby the initial high shrinkage of wet mixed materials resulting from the loss of water separating particles is avoided.

In this case, it is not possible to achieve a coloured surface as the initial surface application of the water tends to wash the fine materials, cement and colour, off the surface and into the body of the material, nor is a very smooth surface practicable.

Although the foregoing two methods allow a stronger mix to be employed in thinner sections than are possible with conventional concrete, the minimum practical thickness is still limited, in the case of semi dry mixes to about 50 mm and in the case of WO91/12218 to about 20 mm.

Cementitious materials as explained above are not regarded as suitable for thin dense smooth surfaces as this would require a high cementitious and water content and this, particularly when combined with rapid drying, results in cracking and premature failure.

Non-cementitious materials such as epoxy resins can be employed to produce a hard, dense, smooth and coloured surface on floors and similar surfaces, but these are relatively expensive and care is required in their use as they can produce toxic reactions.

Where conventional wet placed concrete is employed, a smooth and if required coloured surface can be achieved but this does involve delay/whilst the material sets. In addition, the surface is generally weaker than the main body of the material due to the settlement of the larger aggregates and the consequent concentration of finer particles on the surface which is made worse by the bleed water which rises and increases the water:cement ratio on the surface. The surface is, of course, generally the most vulnerable to attack and this weak surface mortar phase is frequently the cause of premature failure.

THE INVENTION

According to the present invention, a method of producing a thin cementitious surface coating comprises making a dry cementitious material workable by adding excess water (e.g. water:cement ratio exceeding 0.8, e.g. unity, or water adequate to increase the volume by at least 5% over the compacted material before water was added), applying the workable material to a thickness not exceeding 10 mm, preferably under 2 mm and can even be under 1 mm, to a porous surface of a substrate having at least ten (preferably a hundred) times the mass of said dry cementitious material, which surface has the property of high suction on water thereon, causing or permitting compaction of the applied material onto the surface (e.g. the suction is capillary/suction through the pores of the surface while the compaction can in such a case be by atmospheric pressure, optionally mechanically assisted), and allowing the compacted material to mature as a coating bonded to said surface. The compaction should, at least initially, close the surface capillaries so that the subsequent loss of water cannot be readily replaced by air and atmospheric pressure assists the compaction process. The compaction is preferably sufficient to cause the solid particles to touch, preferably substantially reducing voids, and should be completed before the applied material matures, and the rate of the withdrawal of the water is preferably fast enough i.e. the suction is sufficient that, despite the compacting action, substantially no water in the material travels away from the permeable (porous) surface. Preferably, substantially all the water in the material travels towards the said permeable (porous) surface at least as fast as the solid particles. Preferably, substantially no water in the material travels towards the said permeable (porous) surface more slowly than the solid particles or any solid particle. The applied material preferably includes one or more visual-effect additives such as colourings and solids such as mica or crushed stone or flaked slate for texture, sparkle or colour.

The invention extends to a coating so made, and to an object of which such a coating may have become an inseparable or intrinsic part.

The very high water content of the material is not a disadvantage as suggested by conventional wisdom but affords positive benefits in achieving penetration of the substrate and producing an effective bonded monolithic (inseparable or intrinsic) whole. Also according to the invention, such very wet material can be applied as a cement grout to an existing object and dewatered by at least three (preferably at least ten) times (dry basis) the mass of dry (or semi-dry) placed concrete placed on top. This dewatered slurry produces a very strong bond between a substrate and a dry, or semi-dry, screed placed on top. Bonding dry or semi-dry cementitious materials to substrates is normally very difficult as there is no fluid cementitious phase.

What we have discovered is that, far from being detrimental to the performance, a high suction substrate can, in fact, be very advantageous. Indeed this initial loss of water provides a stronger more durable material and eliminates problems of shrinkage cracking which is completely contrary to the prior art teachings. Furthermore, far from attempting to reduce the suction it is essential that this shall be sufficiently high to remove the bulk of the surplus water within a sufficiently short period of time after placing. For this reason, the substrate must have a relatively large water-absorbing capacity, i.e. be relatively massive compared with the wet cement placed on top, i.e. at least ten times the mass of the latter. In fact the higher the initial suction the better, as explained below.

It is clear that the prior art teachings relating to the need to prevent loss of water to the background are true where the water is removed progressively. Provided, however, that the majority of water is removed quickly during the compaction process the loss of water is beneficial as it reduces the voids which are created by the initial water, and the conventional need to fill these voids by the products of hydration hardly arises, as there are far fewer voids to fill. These voids are the cause of weakness, crack nucleation and porosity, and the conventional subsequent removal of the surplus water is a primary cause of shrinkage cracking, stress cracking and fracture.

It is, therefore, an essential prerequisite of the present process that the majority of the surplus water required for workability, placing and initial compaction is removed whilst the material is still capable of being further consolidated so as to enable most of the voids otherwise resulting from the loss of this surplus water to be eliminated.

The reduced water content increases the rate of hydration (water paradoxically acts as a cement retarder), and this, combined with the reduced voids required to be filled, enables the effective hydration process to be completed in a much shorter time.

A key feature of the present invention is the sufficiently rapid rate of water removal to ensure that the bulk of the surplus water is removed whilst the material can compact and this eliminates the voids and cracks which would otherwise be formed and avoids the need to retain the surplus water to produce the cement hydrate to fill these voids. The rate of water removal is preferably such that the material is as resistant to penetration after 15 minutes as an identical material without water removal is after 1 hour or more.

Even if the loss of water results in the temporary cessation of hydration this can readily be resumed with a surface material by subsequently wetting the surface. However, with conventional applications the loss of the surplus water results in shrinkage and cracking, which permanently impairs the performance of the material, which is also avoided in the process of the invention as the reduced water also reduces shrinkage. A reservoir of water in the substrate is important to prevent severe drying of the exposed thin surface coating.

Preferably the porous surface on which the coating is formed is itself cementitious, and this base cementitious material must have a sufficiently high suction so as to ensure the rapid removal of surplus water from the topping or surface coating (i.e. the applied workable material). The base material is important in distributing shrinkage strain, caused by the dewatering process, and thus preventing discrete cracking.

A sufficiently high suction and porosity in the base material (i.e. the permeable surface) is more likely to occur in a newly made base material before the products of hydration have begun to fill the capillaries or other interconnecting voids. This is particularly relevant with semi-dry cementitious mortar screeds and dry-laid cementitious surfacing materials, where improved surface finishing is most desirable, and the initial high suction exerted by that semi-dry or dry-laid material enables the removal of water from the applied coating to be achieved sufficiently quickly. Where, as in this case, the coating is applied before the cement material in the base has significantly hydrated, the two can effectively combine as a single monolithic material. A further feature of the method according to the present invention is the high initial water:cement ratio, such as at least 0.3, required for placing, (when no filler is used). The process, however, allows much higher ratios, e.g. unity, to provide exceptional workability whilst placing, without subsequent detriment to performance. This would normally produce very weak and porous materials with a mass of cracks. Regarding volume changes, the process will bring about a reduction in the volume of wet cement paste of at least 5% and can be 10% or more, based on the loss of weight of water. That is, the withdrawal of the water should be fast and thorough enough that it is accompanied by a volume reduction of at least 5% of the absolute volume of the cement component of the mix, (the actual figure typically being between 10% and 20%). This reduction is dependent on the excess water and on the characteristics of the filler. Since it is known that a 1% reduction in voids equates to approximately a 5% increase in strength, this is a very important and advantageous aspect. By achieving this volumetric reduction at a stage when the material can be consolidated, the subsequent shrinkage and resulting cracking are clearly reduced producing not only a stronger and more durable material but also eliminating a most common form of self-induced failure. The strain capacity of cementitious materials is very limited, typically being less than 0.5%, so that this initial reduction in volume is very important. The initial shrinkage of cement pastes, normally at a maximum with the onset of hydration and initial setting, is the cause of crack initiation leading to long term weakness and subsequent failure in cementitious materials. At the onset of hydration chemical self-desiccation occurs which can be exacerbated by water evaporation which is increased by the temperature rise caused by the exothermic chemical reaction. This very high tendency to shrinkage, higher than at any other time, coincides with the minimum strain capacity as the material is, at that time, transforming from a fluid to a solid. The removal of the surplus water and the reduction in volume and voids according to the invention enables materials consisting of very high cementitious contents, even entirely devoid of Filler, to be satisfactorily employed giving very low initial water:cement ratios and enabling very thin, dense, strong, smooth and impermeable surfaces to be created. The base cementitious material is, especially advantageously, as set forth in PCT International Application Publication No. WO91/12218, and may with advantage be dry (unwetted) at the time of performing the method according to the present invention, or may be still in the course maturing/hydrating/curing. With factory produced cementitious materials the suction of the base could be enhanced by vacuum during manufacture. Physical (manual/mechanical) compaction can in any case be applied to good effect.

The maximum particle size in the said workable material is preferably 5 mm, and most particles should preferably pass a 1 mm sieve.

The filler:cement ratio in the material is preferably less than 4:1, more preferably less than 3:1, and, especially for thin coatings, preferably less than 2:1, but may exceed 5:1 where mechanical means of assisting compaction are utilised. Preferably, therefore, the inclusion of larger aggregate particles is minimised (not maximised as with conventional applications) in order to increase the compaction achieved when water is removed.

If the material contains a large proportion of larger filler particles then these will prevent the free internal rearrangement of particles necessary to achieve the increased compaction and reduction in voids. In addition, of course, the voids actually created by the water are proportionally far less as the surface area of the solid particles is far lower. The removal of the water in this case merely reduces the water available for hydration which provides no increased compaction and then purely is detrimental.

The optimum filler size, grading, filler:cement ratio and thickness are interrelated and dependent also on the means employed for compaction. (There would be progressively less advantage in using the invention as the filler quantity and particle size are increased, as the compressibility, or volume reduction possible due to withdrawal of water, would become progressively less. A conventional concrete where the volume of larger particle sizes is maximised would be of relatively minor use for producing surface coatings according to the invention.) With all cementitious materials for producing surface coatings whether mortars or concretes, the greatest benefit would accrue with cement contents exceeding 500 kg per cubic meter, which contents are according preferred, especially for thinner coatings. Such materials would have a very high strength and low permeability but are normally impractical as coatings as the shrinkage and tendency to self-induced cracking are too high. Preferred limits of the various factors are as follows for representative coating thicknesses, and intermediately for intermediate thicknesses:

| Thickness of coating (mm) | 0.1 | 1.0 | 3.0 | 5.0 | 10.0 |
|---|---|---|---|---|---|
| Ratio filler:cement | ≦1:1 | ≦1½:1 | ≦2:1 | ≦2½:1 | ≦3:1 |
| Filler particle size (mm) | ≦0.04 | ≦0.4 | ≦1.0 | ≦1.5 | ≦4.0 |
| Cement content (kg/m$^3$) | ≧900 | ≧800 | ≧650 | ≧550 | ≧500 |

It is a happy circumstance that the cementitious materials with high cement and small-filler-particles content, as most beneficial in the invention for surface coatings, are those which are conventionally the most difficult to employ because the high initial water content and low filler content result (conventionally) in low strength and high shrinkage.

The cementitious material could include cement substitutes such as Pulverised fuel ash (PFA) or Blast furnace slag (GGBFS) in the same proportions as Ordinary Portland cement (OPC).

DISCUSSION OF THE INVENTION

Because of the dewatering action of the base material/permeable surface, the coating can be applied with very high water contents as a liquid and still produce a strong dense surface and thus be applied as very thin coatings by brush, roller or spray as well as conventional mortar floats and trowels. Such coating can certainly be as thin as 0.1 mm and, of course, as explained above can become an intrinsic part of the base material and cannot be removed separately.

Thicker coatings can of course be employed up to 10 mm and these enable the filler content to be increased and the particle size also to be increased which is advantageous in reducing the amount of water which has to be removed, since the surplus water required for workability is reduced.

The thickness and amount of water included should of course be controlled so that all the surplus water can be withdrawn whilst the material is being compacted or is capable of compacting automatically. This depends on the rate of removal of the surplus water as well as period of time and method of compaction. Thicker coatings would increase the time to absorb the water but this can be offset to some extent by the ability to include more and larger filler particles and thus reduce the water per unit volume of material.

This compaction and water removal must also take place prior to the stiffening of the cement due to the onset of hydration.

Whilst the invention is particularly relevant to thinner cementitious surface coatings which are impractical in other ways, it can also be applied advantageously to cementitious materials up to 10 mm thick containing larger aggregate particles as a lower water and voids level is, of course, always advantageous. The combination of low voids and high solid contents are the basis of the highest quality cementitious materials and this process enables this objective to be achieved.

The process enables cementitious surfaces to be produced which because of the lower water and void content are far more durable, less permeable, stronger and more abrasion resistant than previously possible in particular with thinner coatings.

NEW POSSIBILITIES USING THE INVENTION

The invention can be used to provide cementitious surfaces of quite different characteristics to those previously possible or to provide existing surface effects in a way which is simpler and more effective than by existing means.

Very dense smooth surfaces can be produced by floating the surface, either mechanically or manually, and the progressive stiffening of the surface, due to the withdrawal of the water, enhances the effectiveness of such a process. Normally to produce a smooth surface on cement based materials involves a considerable delay whilst the surplus water is absorbed by the initial hydration process and the material achieves the necessary firmness to resist the pressure required for consolidation and smoothing.

Thin coloured surface coatings can be applied which are extremely hard dense and durable and not previously achievable with cementitious materials and, because the coatings are so thin, materials which might otherwise be uneconomic can be incorporated. Furthermore, because cement colours have to be very fine to be effective, the amount normally included is limited by the adverse effect which the addition of fine materials has on the water:cement ratio, and this limitation is overcome by the process of the invention.

The removal of the water from the surface material produces a firm but plastic material which enables a range of surface finishes to be achieved for example by brushing. In addition, the coloured decorative surface can be cut back (e.g. scribed) to produce authentic-looking brick or stone paving effects with the base material being exposed by the scribing to create the effect of contrasting mortar pointing. Even expensive colourings and other 'cosmetic' additives e.g. mica or flaked slate can be considered, since the actual amounts needed per unit area can be kept tiny. A final sealing coat of polyvinyl alcohol or acetate enhances the appearance and inhibits "lime bloom" from Portland cement.

The rapid surface stiffening of the cement paste can also be used to enable the surface cement layer to be brushed away enabling larger filler particles to be exposed to create attractive finishes, using coloured aggregates, or surfaces with good antislip qualities and abrasion resistance. With conventional concrete, exposing the aggregate normally requires the use of surface retarders to delay the cement hydration on the surface and this involves delay and extra cost.

The invention can also be used where very early resistance to surface damage is required, such as in the restoration of paved surfaces. A liquid cementitious material with a high water content containing a high proportion of accelerators can be used, the high water content initially retarding the chemical reaction, but upon removal of the surplus water and compaction the hardening process is rapidly accelerated. Accelerating hardening of the main body of the material is more expensive and difficult to control. Also the exothermic reaction resulting from such accelerated cement hydration increases the tendency to early thermal cracking, another cause of frequent failure. The heat released by a thin surface coating is readily released to the atmosphere and thermal stresses are not created.

In addition to the use of colour in the cementitious material it is of course also possible to introduce polymers such as acrylic or SBR styrene butadiene rubber to provide other advantages to the topping. The reduction in the initial water content is particularly advantageous with polymers as polymers tend to encourage early cracking which of course can nullify the other benefits. Reducing the initial water reduces the tendency to early cracking as well as giving the benefits of lower voids.

The ability to use fluid cementitious slurries enables multicoloured effects to be achieved by simply brushing or spraying a thin coating on to the surface and readily lends itself to producing permanent multi-coloured concrete art forms.

It is known that the incorporation of fibres in cementitious surfaces can produce a variety of benefits but that these are partly offset by the adverse effect on workability, resulting from the incorporation of the fibres, necessitating the inclusion of increased quantities of water which is deleterious to the matrix. The invention allows fibres to be incorporated with higher initial water contents without the subsequent adverse effects.

DETAILED DESCRIPTION OF THE INVENTION

The invention will now be described by way of example. The base material, which is as described in International Publication PCT WO91/12218, is placed in a dry or semi dry state and compacted, the material being graded and dampened so as to form a firm surface but still retain a high initial suction. A highly workable cementitious material, i.e. water-:cement=1:1, is then spread over the surface and the levelling and compaction are continued as the water is withdrawn into the background material so as to ensure that most of the voids resulting form the loss of water are filled by the compaction process. This compaction process can be by manual or mechanical floating of the surface or vibration or rolling or any other means of compaction or combination thereof.

In the case of thin high cement content coatings the compaction process proceeds virtually automatically as the material is applied by brush, spray or roller, and water is simultaneously removed.

Premature removal of the water is not a problem as additional water can be added to restore fluidity and, provided this is also removed into the background during the surface finishing and compaction process, this is not in any way detrimental to the material. With conventional uses of cementitious materials, regauging (i.e. adding additional water to restore workability) is rightly regarded as undesirable as it increases the water:cement ratio.

The cementitious material for surfacing can be placed on to the surface as a dry or semi dry material, e.g. brushed on as film of dust (very thin), and can then be mixed on the surface with surplus water to achieve the required fluidity, and the mixing can in effect be combined with the spreading and compaction process. A sponge roller can be used as successfully (and requiring less skill) as a steel float, to finish the spreading and compaction. Also, the top layer of the base material can itself be used in this way to produce the smooth dense surface and this forms an effective way of finishing dry or semi dry laid cementitious materials.

CONCLUSION

The process departs entirely from the prior art teachings according to which the application of wet cementitious materials to porous surfaces with a high suction must be avoided because of the adverse effect this has due to the loss of water required for hydration of the cement, leading to reduced strength and other qualities, as well as the increased tendency to early cracking.

The invention utilises this loss of water positively to improve all the properties such as strength which the prior art alleged would be spoiled.

The invention provides a means of achieving strong, hard, impermeable, crack resistant and durable cementitious surfaces.

In addition it also enables far more attractive, smooth, textured, coloured, etc surfaces to be produced.

The process enables a cementitious material to be readily placed as a free flowing fluid and then to be densely compacted simultaneously with the removal of the surplus water. The performance of all cementitious materials is dependent on compaction and reduction of voids.

The process as developed has achieved at least eight desirable objectives which are:

1. A durable wearing surface of very thin sections down to around 1 mm.
2. Low shrinkage, with the virtual elimination of critical early shrinkage.
3. Exceptionally low permeability with high strength, hardness and durability.
4. The material can consist only of cement and fillers, which is very economical.
5. The material can be easily placed as a fluid or dry powder in very thin layers.
6. Good bond to cementitious substrates, in effect forming a monolithic whole.
7. Rapid compaction and resistance to surface impression, i.e. foot traffic.
8. Allows the inclusion of large quantities of fine fillers, ideal for coloured surfaces.
9. Additional water can be added for finishing without detriment to performance.

Thus is opened a range of applications for harder, smoother, less permeable and more durable surfaces as well as coloured and decorative effects.

I claim:

1. A method of producing a thin cementitious surface coating, said method comprising the steps of:

making a dry cementitious material workable by adding excess water;

applying the workable material to a thickness of under 1 mm to a porous surface of a substrate having at least ten times the mass of said dry cementitious material, which material has the property of high suction of water thereon;

causing or permitting compaction of the applied material onto the surface; and allowing the compacted material to mature as a coating bonded to said surface.

2. A method according to claim 1, wherein the added water is adequate for the water:cement ratio to exceed 0.8.

3. A method according to claim 1, wherein the added water is adequate to increase the volume of the dry material if compacted by at least 5%.

4. A method according to claim 1, wherein the applied material contains one or more visual-effect additives.

5. A method according to claim 1, wherein said compaction is such that the volume of dewatered material is reduced by at least 10% compared to the reduction achieved by the removal of water alone.

6. A method according to claim 1, wherein the suction is capillary suction through the pores of the surface.

7. A method according to claim 1, wherein the suction is sufficient that substantially no water in the material travels away from the porous surface.

8. A method according to claim 7, wherein substantially all the water travels towards the porous surface at least as fast as the solid particles.

9. A method according to claim 1, wherein the compaction is assisted by atmospheric pressure.

10. A method according to claim 1, wherein the compaction is sufficient to cause the solid particles to touch.

11. A method according to claim 1, wherein said compaction is such that the volume of dewatered material is reduced by at least 5% compared to the reduction achieved by the removal of water alone.

12. A method according to claim 1, in which the removal of water is so fast as to result in the temporary cessation of hydration, and the water required for subsequent hydration of the cementitious material is provided by a subsequent wetting after the initial hardening of the said cementitious material.

13. A coating on a surface of a substrate produced by a method according to claim 1.

14. An object of which a coating according to claim 12 is an inseparable or intrinsic part.

15. A method according to claim 1, wherein the substrate has at least 100 times the mass of said dry cementitious material.

* * * * *